INVENTORS
Jefferson L. Claiborne,
Edwin T. Bohr

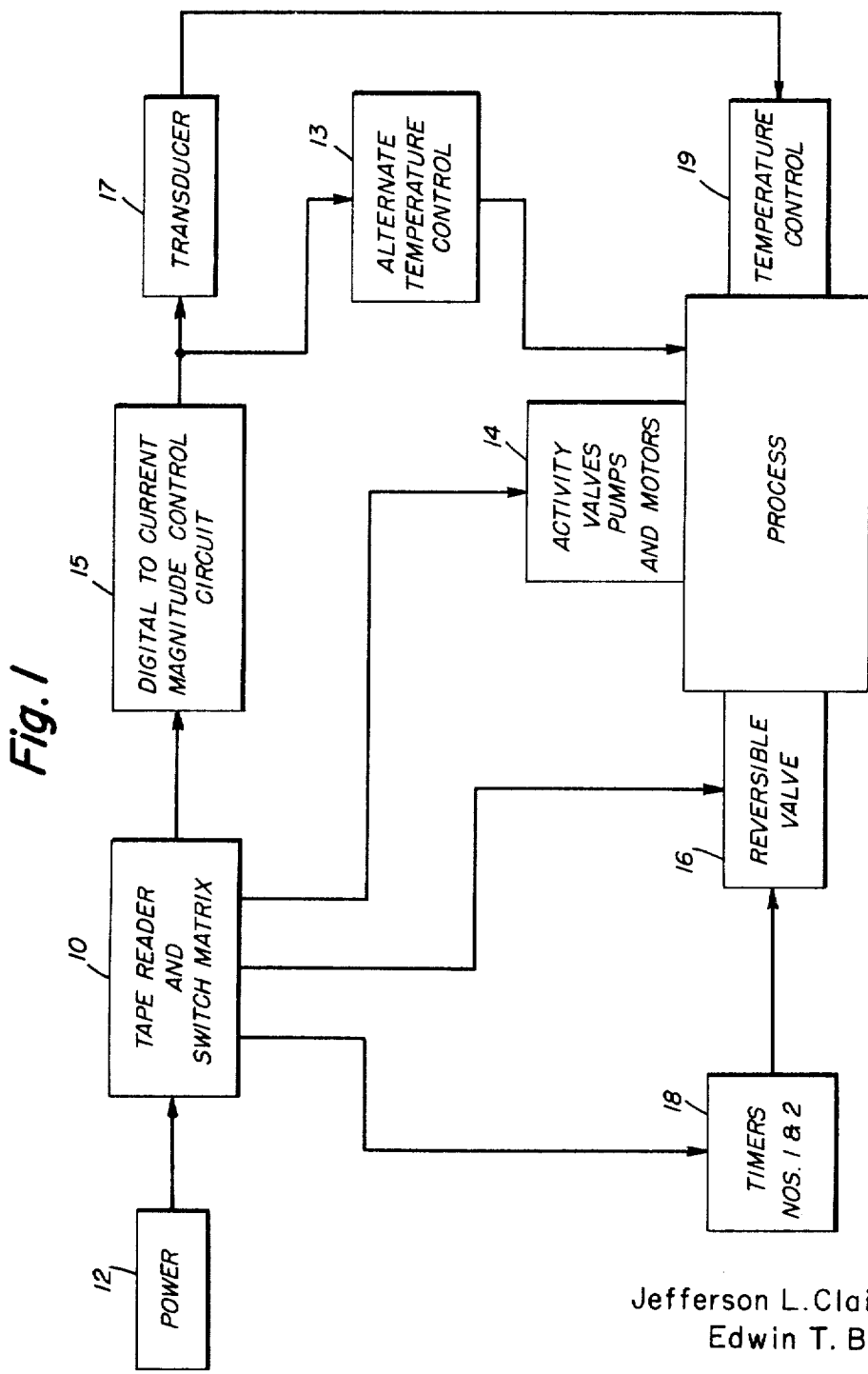

BY
Stevens, Davis, Miller, & Mosher
ATTORNEYS

INVENTORS
Jefferson L. Claiborne,
Edwin T. Bohr

BY *Stevens, Davis, Miller & Mosher*
ATTORNEYS

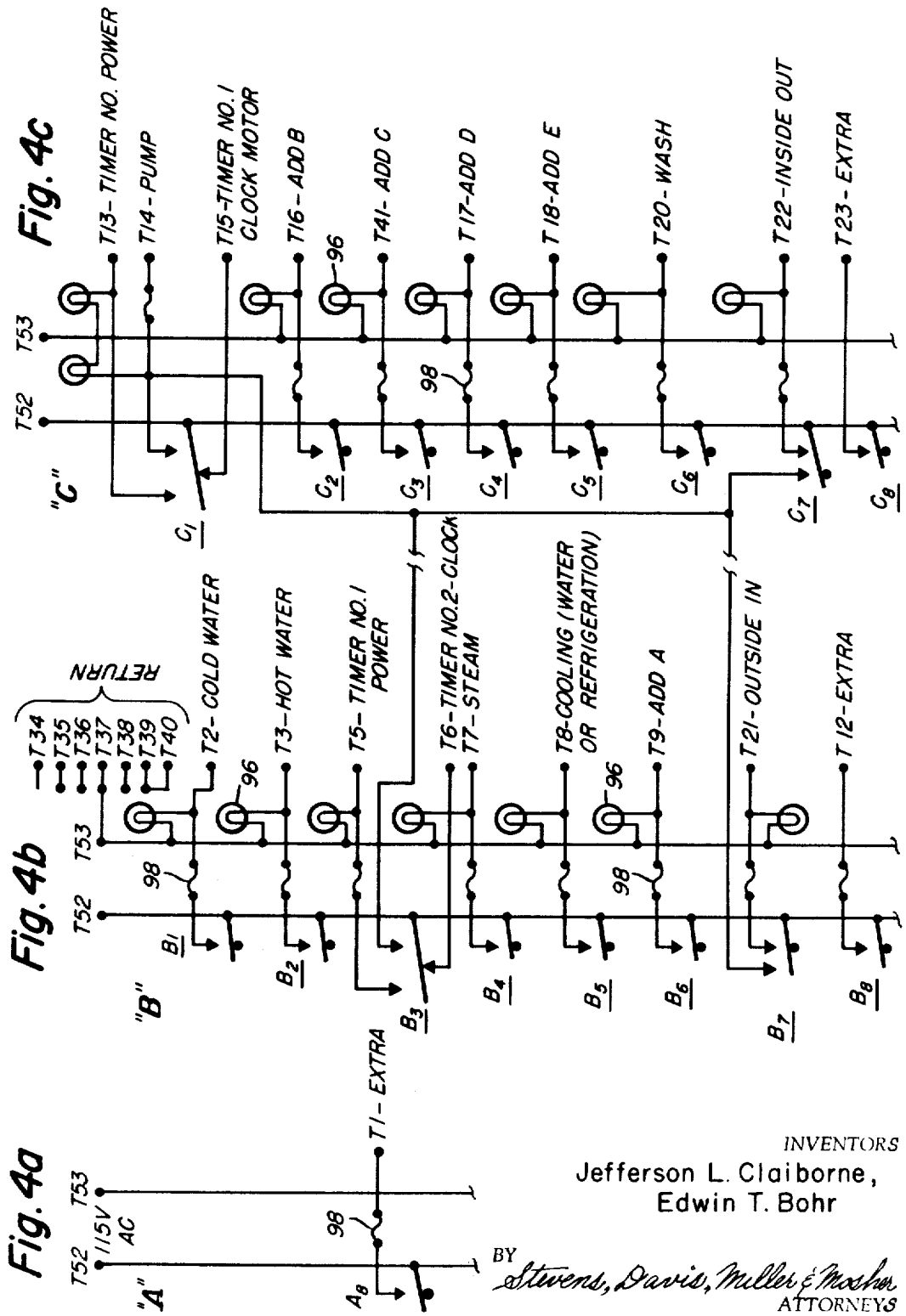

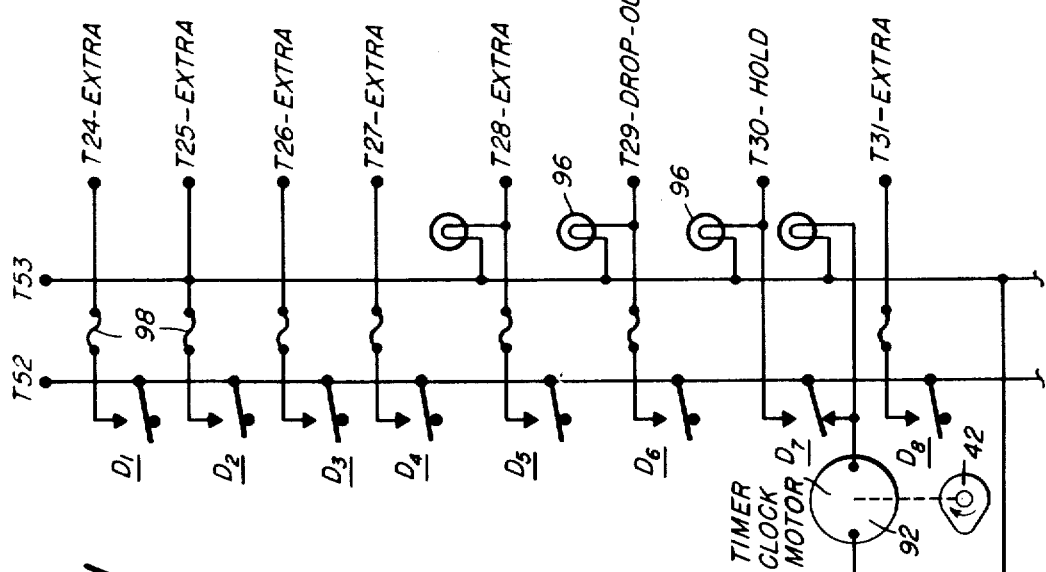

Feb. 27, 1968  J. L. CLAIBORNE ETAL  3,371,318
AUTOMATIC CONTROL SYSTEM FOR PROCESS OF PACKAGE DYEING YARN
Filed June 3, 1964  7 Sheets-Sheet 7

INVENTORS
Jefferson L. Claiborne,
Edwin T. Bohr
BY Stevens, Davis, Miller & Mosher
ATTORNEYS

United States Patent Office 3,371,318
Patented Feb. 27, 1968

3,371,318
AUTOMATIC CONTROL SYSTEM FOR PROCESS
OF PACKAGE DYEING YARN
Jefferson L. Claiborne and Edwin T. Bohr, Chattanooga,
Tenn., assignors to Dixie Yarns, Inc., a corporation of
Tennessee
Filed June 8, 1964, Ser. No. 373,463
18 Claims. (Cl. 340—172.5)

ABSTRACT OF THE DISCLOSURE

An automatic batch process sequence controller including a punched tape bearing programmed process sequence control information, a tape reader sequentially reading the programmed information on a fixed time basis and feeding a plurality of latching relays formed in an electrical scanning matrix each of which controls an effectuating switch of a particular activity for the process. A timer is provided to establish a time reference for the process but the timer can be interrupted in response to the programmed information and restarted manually to initiate the continuance of the process. A plurality of the latch relays controls switches of a digital to analog temperature control circuit having a high current amplification factor to assure linearity and which feeds a temperature controller for the process in accordance with the programmed information.

---

This invention relates to the method of package dyeing yarn and more particularly to a method of automatically controlling a plurality of steps or activities in proper sequence, said activities being present in the dyeing and treating process.

It has been a problem in the yarn making and dyeing industry to match exactly in a subsequent dyeing process the dye or coloring characteristics of yarn previously run through the same process. The primary factor contributing to this problem is that the exact temperature and the exact time sequence of various activities of the process could not be exactly reproduced with the existing non-automatic process control systems. Consequently, there would be slight color variations in the yarn of two different batches even though the same dye and the same temperature control system were employed. This problem is evidenced by the fact that the yarn or material dyeing industry has placed a number on all yarn made and sold, said number corresponding to the particular dyeing process through which that yarn was run. The buyer then must match the lot of yarn with other lots having the same number to be sure that there will be no color variation in the final article of clothing made from said lots.

Another problem in the prior art is the necessity of having manual controls for the activities of the dyeing process. Heretofore, the activity sequence of the process was set forth on charts comprising a timetable. These charts were read and the proper valves were opened and closed for the respective activities in correspondence with the charted timetable. However, this method of controlling the process is unreliable, subject to human error, and requires many personnel which increases the manufacturer's cost of the finished product.

It is a primary purpose of the present invention to set forth an automatic control system which would avoid the above-mentioned problems in the industry.

It is another object of the present invention to incorporate a program tape reader for controlling the various activities of the dyeing process.

It is a further object of the present invention to incorporate instrumentation which is capable of stopping the process at any desired point and holding those conditions which are present at that time until the operator or supervisor can check or sample the system.

It is another object of the present invention to provide an automatic tape reader for controlling activities of the dyeing process which does not need a complex and expensive memory and storage system for controlling the activities of the process in proper sequence.

It is still another object of the present invention to provide an automatic tape reader for controlling the dyeing process which can read an easily programmed tape, said tape reader using a matrix comprising latching relays for controlling the activities of the process.

It is still a further object of the present invention to provide a tape reader which reads the temperature control information in digital form and feeds this information to a circuit which converts this digital information to a current magnitude which corresponds to the desired temperature. This current is then fed to a pneumatic transducer which controls the mechanical means which controls temperature.

It is another object of the present invention to provide a novel rotary step switch arrangement in conjunction with the tape reader circuit that prevents arcing when the switch comes in contact or leaves contact with any of the stationary contacts of the rotary switch.

It is yet a further object of the present invention to provide an automatic dyeing process control system which requires minimum maintenance, practically no manual control, and which functions with a great degree of reliability and accuracy.

It is yet a further object of the present invention to provide a dyeing process control system which is extremely accurate and reliable so that one process run will be almost exactly like all subsequent process runs, whereby the color characteristics of yarn or material run through said process will be practically identical.

Other and further objects of the present invention will become apparent with the following detailed description in view of the attached drawings in which:

FIG. 1 is a block diagram representation of the overall control system;

FIGS. 4a, 4b, 4c and 4d are schematic representations showing the power, switch and activity control terminals;

FIG. 7 is a chart illustrating the switch, change in temperature, change in current relationships.

Brief summary if system

Figure 2A:
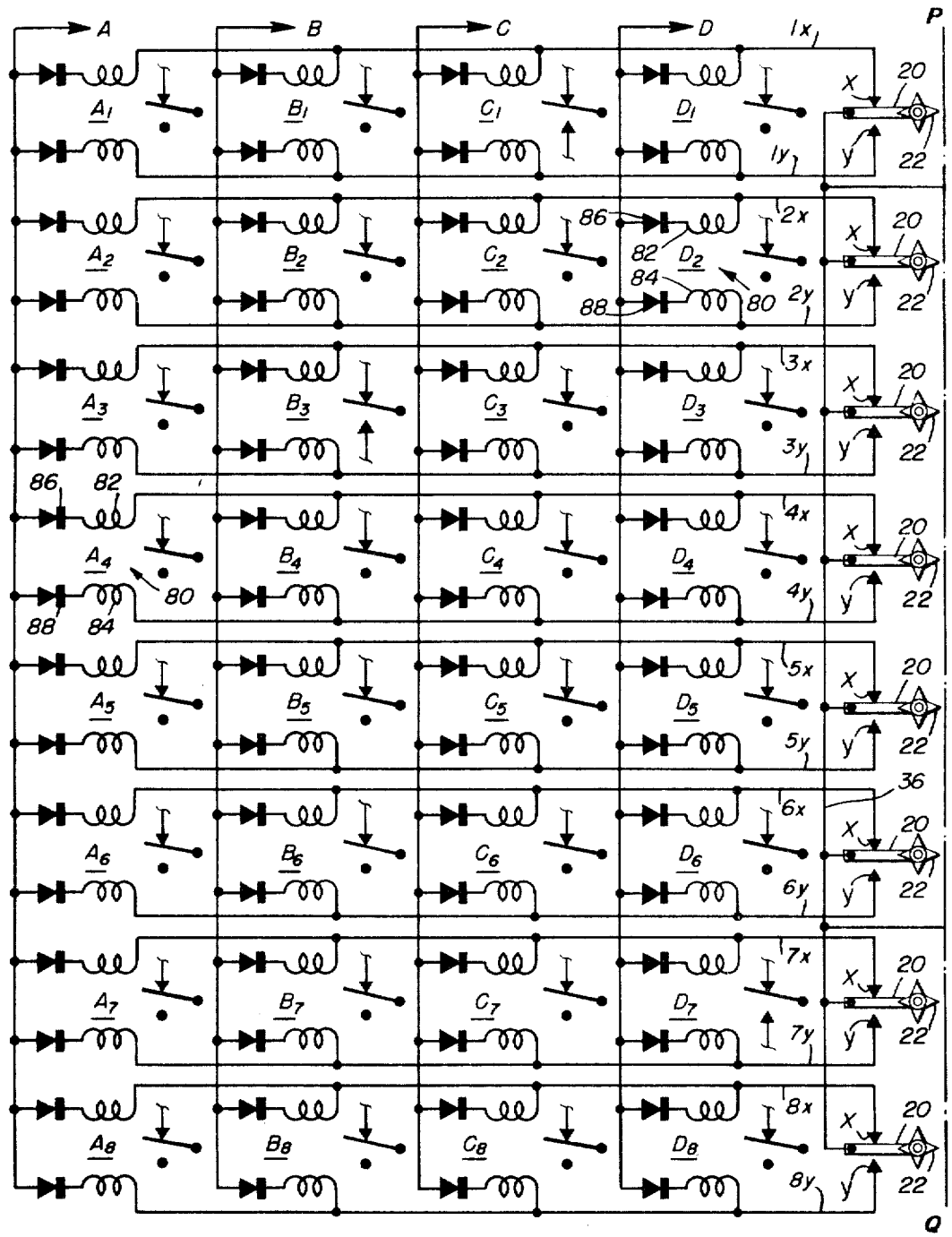
FIGS. 2a and 2b show a schematic representation of the tape reader, rotary switch and column selector, and latching relay control matrix.

Referring now to FIG. 1, there is illustrated a block diagram of the overall control system as it is functionally related to the process. A tape, of the type to be described, is programmed or punched in accordance with the desired sequence and duration of events of the process and said tape is fed into the tape reader 10. Tape reader 10 reads the tape in time sequence and, in accordance with the command or program on said tape, operates certain switches found in the switch matrix in a manner described below. Electrical power from the power unit 12 is fed through those switches which are closed by the tape reader, and power is thus provided to the activity valves, pumps, and various motors 14 at the dyeing process station. The various activity valves, pumps, and motors 14 are actuated in accordance with the commands that are programmed on the punched tape which is read by tape reader 10.

Also programmed on the tape are commands to energize the reversible valve 16 (for flow direction) for the dyeing process station. The valve timers 18 are energized at the same time that the pumps 14 are energized. Once the pumps 14 and valve timers 18 have been given an "on" command, the reversible valves are controlled by the timers 18 until another command is received from the tape reader and switch matrix.

The temperature for the dyeing process is also controlled by commands which are programmed on the punched tape and these commands are read from the tape in digital form. This digital information is fed to the digital-to-current-magnitude control circuit 15 which converts the digital reading to a direct current, the magnitude of which is related to the desired temperature of the process. This DC current is fed to a transducer 17, for example, current to pneumatic pressure, said transducer controlling the temperature control valve 19 for the process. An example of such a temperature controller is the Foxboro Model 40 Narrow Band Proportional Controller.

If desired, an alternate temperature control 13 can be used in place of transducer 17 and temperature control 19. The alternate temperature control 13 is adapted to operate directly off the current magnitude from control circuit 15, thus eliminating the need for a pneumatic coupling system.

*Tape reader and switch matrix*

Figure 2B:
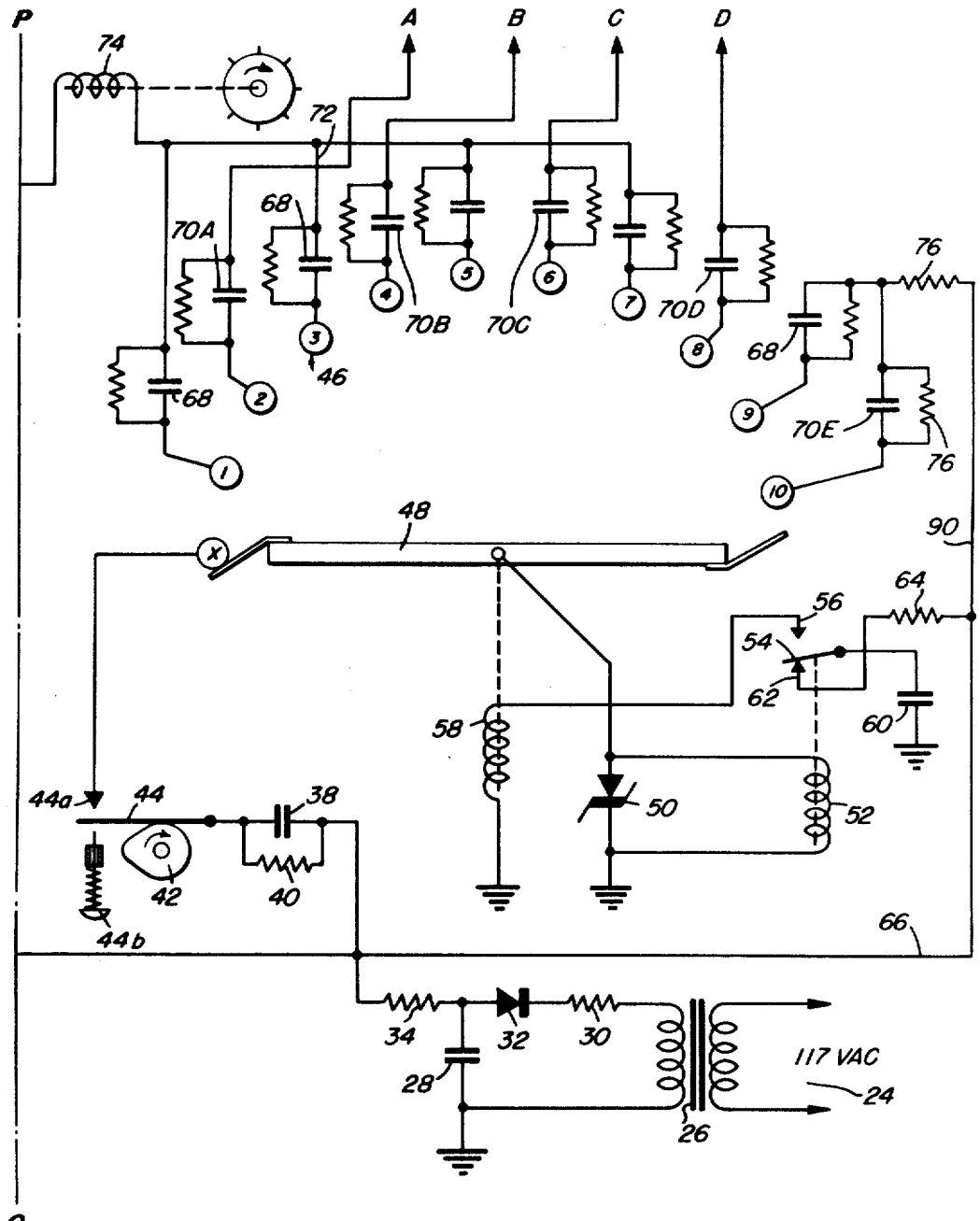

Referring now to FIGS. 2a and 2b, there is shown a schematic diagram of the tape reader and switch matrix selection circuit. FIGS. 2a and 2b should be read as being joined along lines P–Q therein. The tape reader comprises a plurality of switch contact arms 20 each having a star finger 22 rotatably mounted at the end thereof. Star finger 22 rides on the surface of the tape, and when a hole in the tape is positioned thereunder, fingers 22 will move to a downward position and thus close the y contact associated with switch arm 20. The plurality of switch arms 20 and fingers 22 are mounted laterally across the tape and are adapted to simultaneously read one column of programmed information of the tape. In this example, there are eight readers for reading eight rows of one column of programmed information simultaneously, but it is to be understood that this number may be varied without departing from the spirit of the invention. An AC voltage source 24 is coupled to transformer 26, the secondary of transformer 26 being connected in series with a storage capacitor 28, which has one side connected to ground, a current limiting resistor 30 and a rectifying diode 32. This particular circuit provides for the negative potential, approximately −150 volts, which is necessary to energize the relay matrix, scan-step coil, and tape-advance coil as will be described below. The design of the circuit is such that once storage capacitor 28 is charged, it continues to supply voltage to operate the latching relays and related circuitry notwithstanding the failure of voltage source 24. The −150 volt source is connected through a current limiting resistor 34 to a node 36 which is common to all the reading switch arms 20. Also connected to the far end of resistor 34 is a blocking capacitor 38 shunted by a bleed resistor 40, the parallel combination of which is connected to a mechanical switch arm which is activitated by (in this example) a 2½ minute rotary cam 42. Cam 42 is driven by a synchronous clock motor which is energized in a manner described below. The contact between switch arm 44 and contact 44a is normally open and is electrically closed by the initiate contact of cam 42 every 2½ minutes for a purpose to be described herein below.

Contact arm 44 can also be actuated by push button 44b notwithstanding the angular position of initiate contact of cam 42.

A rotary stepper switch generally indicated as 46 forms part of the column scan means and is commonly known as a 180° round-and-round switch. In this example, switch 46 has eleven contacting positions numbered 1 through 10 and "x," for a home position, and two wiper arms 48 disposed in a 180° relationship. The electrical center of wiper arms 48 is connected to ground through a parallel circuit comprising Zener diode 50 and a step-coil actuating relay 52. The switch arm 54 of relay 52 moves to contact terminal 56 which is connected through the scan-step coil 58 to ground, while switch 54 is connected to ground through a storage capacitor 60. Switch 46 is characterized by the fact that wiper arm 48 moves from one contact to the next upon deenergization of the field of coil 58. Tape advance coil 74 also actuates movement of the tape advance mechanism upon deenergization thereof so that the tape is moved and seated before arm 48 advances to the next contact in a manner more fully described below. The other contact 62 of the double pole, single throw relay 52 is connected through a current limiting resistor 64 to the negative voltage supply 28 via lead 66. A plurality of capacitors 68 are connected to rotary switch contacts 1, 3, 5 and 7 and 9 and a second plurality of capacitors 70A through 70E are connected to switch contacts 2, 4, 6, 8 and 10, respectively. All capacitors 68 and 70A–70E are shunted by bleed resistors which could be external or internal resistance. The home switch contact x is connected to the initiate terminal 44a. The capacitors 68 have their negative terminals connected to common lead 72, and said lead is connected through tape-advance coil 74 to the common node 36. Capacitor 70A has its negative terminal connected to the single column lead for latching relays of column A, capacitor 70B has its negative terminal connected to the single column lead for latching relays of column B, capacitor 70C has its negative terminal connected to the column lead of column C, and capacitor 70D has its negative terminal connected to the column lead for column D. The contacts 9 and 10 of rotary switch 46 are "extra" contacts in case another column of latching relays is to be used.

Referring now to the left hand side of FIG. 2, there is illustrated the latching relay and control matrix for the tape reader. Each latching relay 80 is a four pole, double throw relay and comprises two coils 82 and 84 having one terminal connected in common with all the other corresponding terminals of the latching relays in that row. These terminals of coils 82 are commonly connected to the x contact associated with contact arm 20. In the same manner, the corresponding terminal of coil 84 is connected to all the other terminals of the corresponding coils 84, and they are in turn connected to the other y terminals associated with switch contact arms 20. The other terminals of coils 82 and 84 are connected to diodes 86 and 88, respectively, which have their plates connected to a common node or lead for the entire column. For the purpose of clarity, the first column is designated column "A," the second column "B," the third column "C," and the fourth column "D." The common node for column A is connected to the negative side of the capacitor 70A, column B is connected to capacitor 70B, column C is connected to capacitor 70C, and column D is connected to capacitor 70D. Also for the purpose of clarity, the rows are designated to correspond with the row associated with the reading switch 20; for example, the top row is row 1, the second row is row 2, the third row is row 3, and so forth down to row 8 for this example.

It therefore follows that each latching relay can be given a column and row designation, for example, $A_1$, $B_1$, $C_1$, $D_1$ refer to all latching relays in all columns in position 1. The latching relays are characterized by the fast that the relay remains mechanically locked or latched in the state corresponding to the last binary command even though power is removed from all circuits. This relay is a conventional relay and does not, apart from the disclosed combination, constitute the present invention. This relay is commonly known as Latching Relay KB17AG manufactured by Potter & Brumfield.

The control switch contact associated with each relay takes on the designation of that relay and engages either one or the other of the associated contacts depending on the last coil, either 82 or 84, which was energized for that particular latching relay. These switches retain their given designation and appear in FIGS. 4a through 4d and function to control the activity valve or motor by supplying power thereto when closed. This function will be described further below.

Latching relays have the characteristics of responding to the binary commands of "x" or "y" from the reader contacts 20. When contact arm 20 of row 1 is in its up position, a negative voltage current pulse is applied through lead 1x through the coil 82 of the latching relay being scanned or examined, through diode 86 and to ground in a manner to be described below. Consequently, the associated control switch $C_1$, for example, will be pulled to its uppermost position, if it were previously in the lower position, and will remain there even though current is no longer provided at coil 82 for relay $C_1$.

*Operation of tape reader and switch matrix*

The tape reader and switch control operate in the following manner. The switch contact 48 is in the home position, contact "x," and a tape is inserted to start the operation of the tape reader. The 117-volt AC source 24 supplies power through transformer 26 and negative voltage source capacitor 28 is charged to approximately −150 volts through rectifying diode 32 and current limiting resistor 30. Pushbutton 44b is depressed to start the operation. The depression of button 44b closes contact between initiate contact 44 and terminal 44a. A negative voltage pulse is then fed from capacitor 28 through current limiting resistor 34 through blocking capacitor 38 through terminal 44a, contact x, sweep arm 48, through step coil 52 to ground. Zener diode 50 establishes a voltage limit to aid uniform relay driving voltage for coil 52, said diode 50 breaking down when excess back bias is applied thereacross.

The pulse through coil 52 causes arm 54 to contact terminal 62 and storage capacitor 60 is therefore charged. When electrical contact between terminal 44a is broken with the release of pushbutton 44b or when capacitor 38 is fully charged, current will cease to flow through coil 52 and arm 54 again contacts terminal 56. Resistor 40 bleeds the charge on capacitor 38 to zero and prepares said capacitor for the next charging thereof.

When arm 54 contacts terminal 56, the charge on capacitor 60 passes through scan-step coil 58 to ground. When the current in coil 58 goes to zero and the field of said coil is de-energized, sweep arm 48 moves to contact 1. This causes a negative pulse to transmit through resistor 34, node 36, tape-advance coil 74, blocking capacitor 68, through step-coil actuating relay 52 to ground. The current through the step-coil actuating relay 52 throws contact arm 54 to contact terminal 62 and thus capacitor 60 is again charged in the negative direction through current limiting resistor 64.

The tape was advanced when the negative pulse went through the tape-advance coil 74 and positioned the first programmed column of information of the tape under the reading fingers 22 of all positions 1 through 8. The tape advance mechanism was actuated not with the build-up of the field about coil 74 but with the diminishing thereof when the current therethrough went to zero with the passing of the aforementioned negative pulse. It is particularly pointed out that the characteristics of the circuit including the tape-advance coil are primarily inductive so that the current at time zero is substantially zero and builds up slowly with time. Therefore, when the sweep contact moved from the home position to position 1 of contact switch 46, there was no arcing.

As capacitor 68 continues to charge and reaches its maximum charge so that the voltage across capacitor 68 is substantially 150 volts minus the Zener voltage of diode 50, the current through step coil 52 reduces to zero and releases switch arm 54 which then contacts terminal 56. The negative voltage appearing across capacitor 60 then discharges through the scan-step coil to ground which causes contact arm 48 to move to position 2 in the manner described above. Again, it is pointed out that the current through contact arm 48 is substantially zero when contact arm 48 moves from position 1 and again, arcing is avoided. The charge on capacitor 68 is reduced to zero by the shunting bleed resistor and said capacitor is again ready to be charged on the next cycle of operation.

It should be remembered that both the coil for the stepper advance and for the tape advance operate on de-energization rather than when they are energized so that operation occurs during open circuit. Tape advance coil 74 and relay coil 52 are always energized simultaneously. When they are simultaneously de-energized the tape advances one step. At this instant capacitor 60 dicharges through 54, 56 to coil 58 and energizes coil 58 for a time determined by the nature of the capacitor 60. By this time the tape advance has completed its movement. Arm 48 does not move until capacitor 60 has completely discharged and the field about coil 58 de-energized.

Let is be assumed that holes appear in the tape at positions 2 and 4 of the first column under detector fingers 22. The negative voltage appearing at node 36 will then pulse through contact arm 20 of position 2 through lead 2y, through coil 84 of $A_2$ through diode 88 of $A_2$, and begin to charge capacitor 70A from ground through the step coil 52 and contact arm 48. In the same manner, there will be a current pulse through coil 84 of latching relay $A_4$, and consequently, the control switches $A_2$ and $A_4$ will be switched to their opposite states and latched therein. The pulse through step coil 52 again throws switch contact 54 to terminal 62 and capacitor 60 is charged in a negative direction. When capacitor 70A is almost fully charged, the current through coil 52 goes to zero and switch contact 54 then engages terminal 56. Capacitor 60 then discharges through the scan-step coil causing contact arm 48 to move to position 3.

With contact arm 48 in position 3, there will be another pulse through tape-advance coil 74 as capacitor 68 begins to charge. This advances the tape so that the next column of punched holes is positioned under contact fingers 22. Those contact fingers 22 which sense a hole therebeneath enable a negative pulse to pass through the y-line associated therewith and trip the corresponding control switch associated with the latching relay in column B.

It is pointed out that as the tape moves from one column to the next beneath the fingers 22, the x-lines are connected by all switch arms 20. However, since the contact arm 48 engages either at position 1, 3, 5 or 7 at this time, there is no completed path between any of the coils 82 and 84 of any of the latching relays to ground. Consequently, none of the control switches $A_1$ through $D_8$ can be switched except when a column on the tape is squarely positioned under the contact fingers 22.

The contact arm 48 switches from contacts 1 to 9 in a manner as described above and the tape is advanced in a like manner as that described above. Furthermore, four columns are read as described above. When contact arm 48 reaches position 9, it will be stepped due to the negative potential continuously applied to lead 90. Note that the pointer is stepped but the tape-advance coil is not energized so that the tape is not advanced. Contact arm 48 then contacts position 10 and again, a negative pulse is applied through contact arm 48 to advance the contact arm 48 without advancing the tape. When the scan-step coil causes contact arm 48 to move from contact 10, the other contact arm of 48 comes to rest on home position x and remains there until the initiate cam 42 closes contact arm 44 with terminal 44a and the whole reading of the next four columns of the tape again takes place in the manner described above.

It is pointed out that the complete scanning of positions 1 through 10 takes place in approximately one second and the reading of the four columns and eight rows, 32 bits of information, takes place during that one second. Contact arm 48 then remains on home position for approximately 2½ minutes which the activities which were initiated during the reading take place in accordance with the design of the process.

Assume now that cam 42 closes contact arm 44 with terminal 44a and contact arm 48 is transferred to position 1. The tape is therefore advanced in the same manner as described above, and the first column of the next group of four columns is placed in position under the contact fingers 22. Let us assume now that there is no hole at row 2 and there is a hole at row 4. The reader will recall that for row A of the tape in the first group of four columns there were holes at both $A_2$ and at $A_4$. Consequently, when contact arm 48 is moved to contact 2 of the rotary switch, a negative current pulse will be supplied through lines $1x$, $2x$, $3x$, $5x$, $6x$, $7x$ and $8x$ and also line $4y$. The contacts of the control switches $A_1$, $A_3$, $A_5$, $A_6$, $A_7$, $A_8$ will remain in their up positions since there is no change from the prior commands of the first reading. Switch $A_2$ will be switched from its lower position to its upper position due to the change of command. A negative current pulse is sent through lead $4x$ and through coil 82 of latching relay $A_2$ and therefore pulls the control switch from its lower contact position to its upper contact position and latches the switch therein. The control switch for latching relay $A_4$ remains in its lowermost position because the negative pulse appears on line $4y$ and through coil 84 of latching relay 84 which is the same as the first reading for column A.

The rotary contact 48 is rotated through all contact positions in a manner as described above and the tape is advanced the corresponding number of rows so that all programmed information in the four column group is read. When switch contact 48 arrives at the home position, all activities commanded to be actuated or stopped will do so and that condition will prevail for the next 2½ minutes.

By using the latching relay matrix, it can be seen that complicated and expensive electronic memory circuits and storage systems are avoided. This keeps the cost of the control system to a minimum and provides for extremely reliable and efficient operation.

Control of activities

Figures 3, 6:
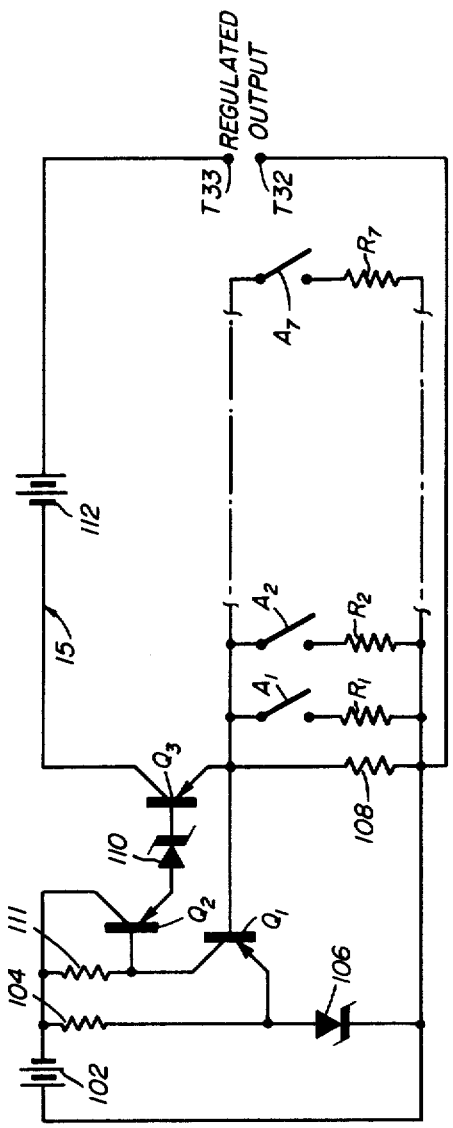
FIG. 3 is a chart showing the sequence of the various activities of one example of a dyeing process.
FIG. 6 is a schematic representation of the digital to current amplitude control circuit.
Figure 5:
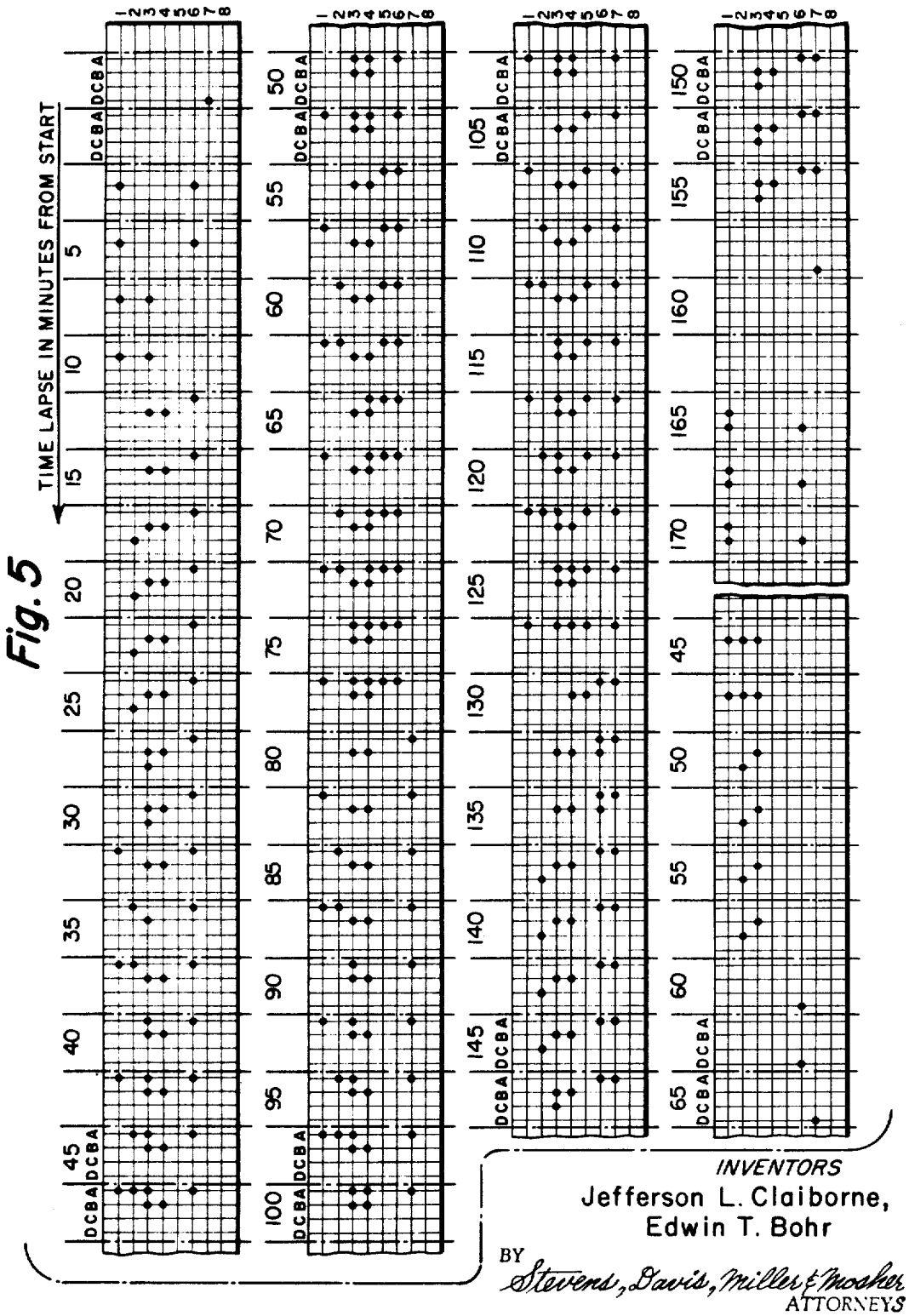
FIG. 5 illustrates the punched program on a tape for the example process of FIG. 3.

Referring now to FIG. 3, there is shown the various activities performed by conventionally designed apparatus at the process location. FIG. 3 shows a sequence chart for the various activities indicating in black when the particular activity is in operation for one example run. FIG. 5 shows the tape incorporating the punched program which actuates and commands the tape reader in accordance with the sequence of activity operation for that example. The numbered row positions and lettered column positions and the real time in minutes have been added to the figure for the purpose of clarity and reference. Referring now to FIG. 4a, there is shown the control switches as connected between the power source and the respective activity for column A. Column A primarily functions to select and control the desired temperature of the process which will be described hereinbelow. FIGS. 4b through 4d show the corresponding switches in the columns B, C and D as they are related to their respective activities which the switches enable power to actuate. As indicated in FIG. 3, the first activity is hold and sample which is controlled by latching relay $D_7$. This first hold and sample only functions to make the operator aware that the process is beginning, as it requires manual operation of the start push button to begin the sequence. To effectuate this activity, a hole is punched in column D, position 7, which will effectuate control switch contact $D_7$ in a manner as described above. When hold and sample is effected, the control switch of $D_7$ will contact the normally open contact and the time clock 92 will not operate to rotate initiating cam 42. Thus, no further readings will take place until push button 44b is purposely and manually actuated by the operator to begin the dyeing sequence. Push button 44b will advance the tape as described above and since there is no hole for $D_7$ in the second group of four columns, $D_7$ will assume its normally closed position. From then on, the clock timing motor 92 will effect the advancement of the tape until another hold is read on the tape. The next sequence of four columns is read by the tape reader, and it can be seen from the chart on FIG. 3 that cold water is added along with composition A. The activities of add cold water and add A are associated with $B_1$ and $B_6$, respectively, and this is programmed on the tape as indicated in FIG. 5. Cold water and composition A will be added for 2½ minutes when the tape is advanced and the four columns in the next group will be read. Since cold water and composition A are to be added for more than 2½ minutes, the steps of add cold water and add A are again programmed and said two steps of the process will continue.

When the next group of four columns are read, the adding of composition A will stop but the adding of cold water will continue as indicated in FIG. 5 and the chart of FIG. 3. To insure that the proper amounts of liquid and chemicals are added to the process, there are level controls completely external to the instrument itself and on the machine which turn off the water when the proper level is reached. Therefore, though the water is left on, no more water than necessary will be added to the machine because of this level control. The addition of chemicals such as A, B or C are controlled by a valve which is also external to the instrumentation and these additions can be made to continue up to the programmed time or anything less than said minimum time (2½ minutes).

The following groups of columns are read in the same manner as hereinbefore described and when the group at 157½ minutes is read, $D_7$ again is actuated and a hold and sample results therewith. At this time the operation stops and a sample of dye can be taken to compare it with a known standard. Note the clock 92 is stopped and the entire process suspended. Once again, push button 44b must be manually actuated to initiate the reading of the tape and the further control of the process. After push button 44b is depressed, clock 92 is energized and the remaining steps of the process are sequentially actuated. The process continues until $D_7$ is again read which terminates the entire process. It can be seen that each activity is protected by a 10 amp. fuse 98 to guard against short circuits and reduce the possibility of overheating. Lamps 96 are physically arranged at the control panel board and give a clear indication of which activity is in process so that the operator is kept completely informed and can match his timetable chart shown in FIG. 3 with the lighted lamps, if desired.

If for any reason an activity is to be cut short or omitted during operation, the operator merely has to actuate push button 44b to advance the tape.

The terminals T are plug-in type terminals and the leads going from these terminals to the respective activities are preferably in a common cable. The return lines from each activity are also disposed in common cable and are spliced or manufactured together so that they return to the six return terminals T34 through T40 (see FIG. 4b). Each line is protected by a 10 amp. fuse 98.

Referring to control switches $B_3$, $B_7$, $C_1$ and $C_7$, it is pointed out that all said switches are wired to terminal T14, which in turn is connected to the pump. Therefore, when switch $B_3$ is thrown to contact the upper two contacts thereof, the pump is energized, and at the same time valve timer No. 1 is energized through terminal T5 and T15. The valve timer, which is more fully described in U.S. patent application Serial Number 373,457, filed June 8, 1964, entitled Automatic Control Apparatus, inventor, J. Lyle Claiborne, which has the same assignee as the present invention, controls the operation of the valve and reverses the valve at the desired time. The reason for this type valve control is so that the valve does not have to wait 2½ minutes until the next tape reading to be reversed. Therefore, the valve can operate on a time basis which is separate and distinct from the time reference of the tape reader. However, if the flow direction need only be controlled every 2½ minutes, such control can be quite easily programmed on and effected by the tape.

When the switch $C_7$ is energized, the pump is energized through terminal T14, and the direction of the valve will be effected by the signal on T22, which, in this example, is "inside out." A light in the process area will indicate that the dye is being pumped inside out, said light being energized by the signal at terminal T22. In the same manner, if the valve is to have a direction of "outside in," $B_7$ is energized and again, the pump is energized through terminal T14 and its direction determined by signal on terminal T21 and an "outside in" light on the panel is lighted by the signal at terminal T21.

Referring to switch $C_6$, when $C_6$ is energized, the "wash" activity is effected by the signal through terminal T20.

Terminals marked "extra" are at present not used in the known dyeing process; however, these terminals give flexibility to the control system and enable more activities to be added to the process without changing the control system in any way.

*Temperature control*

As was mentioned above, the tape reader only reads digital information, and therefore, in order to control desired temperature variations in a smooth and analog manner, the system comprises a digital-to-current-magnitude control circuit 15 as seen generally in FIG. 1. The temperature control is effected by the seven bits of information having the positions $A_1$ through $A_7$. The temperature control in 19 of FIG. 1 has a lowermost setting of 50° F. and a maximum setting of 250° F. Therefore, a range of 200° F. can be effected and must be programmed on the tape by the seven bits of information $A_1$ to $A_7$. To effect this desired change and correspond with the minimum and maximum temperature range, a minimum of 10 ma. DC current is fed to the transducers 17 from the digital-to-current-magnitude control circuit 15. A maximum of 50 ma. which corresponds to the maximum setting of 250° F. can also be fed from magnitude control circuit 15 to the transducers 17. This leaves a range of 40 ma. which must correspond in a linear manner to the 200° F. for proper current magnitude to temperature control.

If a linear relationship between current and temperature is to be maintained, every one-half ma. change of current must correspond to 2½° F. change of temperature. Therefore, assuming that 2½° F. is the minimum allowable tolerance for temperature control, the current magnitude control circuit must be able to produce current with eighty different magnitudes depending on programmed information. Again, this range must be represented by only seven bits of information.

Temperature and current variation is controlled by the switches $A_1$ to $A_7$ as shown in the chart of FIG. 7. The chart is to be read as follows: when switch $A_1$ is energized, the minimum temperature variation 2½° F. is added to the process by the temperature controller in view of the increase of one-half ma. fed to the transducer 17. If a temperature increase of 5° F. were desired and programmed, control switch $A_2$ would be energized and a current increase of one ma. would be fed to transducer 17, thus causing temperature controller 19 to increase the process temperature by 5°. The values of $\Delta T$ and $\Delta I_0$ are shown with their corresponding control switches $A_3$ to $A_7$ and the individual operation of any of these switches will effect the temperature and current change as shown.

If it is desired to raise the temperature of the process 127½°, switches $A_7$, $A_4$, $A_2$ and $A_1$ will be energized so that 25½ more ma. will be fed to transducer 17 by the current magnitude control circuits 15. It will be noted that the value of $\Delta$ temperature and $\Delta I_0$ are 20° F. and 4 ma., respectively, for both switches $A_4$ and $A_5$. This is necessary to enable all eighty possibilities of settings from 0$\Delta$ temperature to 200° F. $\Delta$ temperature with 2½° F. being the least increment of $\Delta$ temperature.

The digital-to-current-magnitude control circuit is illustrated in FIG. 6 and comprises a DC voltage source 102 connected in series with resistor 104 and Zener diode 106. Zener diode 106 establishes a reference potential for the emitter base connection of transistor $Q_1$ and is also connected in series with resistor 108 which is the sensing resistor for the feedback loop defined by transistors $Q_1$ and $Q_2$, the operation of which will be described below. Transistor $Q_1$ has its collector connected to the base of transistor $Q_2$. $Q_2$ has its emitted coupled through a Zener diode 110 to the base of transistor $Q_3$. Transistor $Q_3$ acts as a variable resistance and is in series circuit with a voltage source 112 which supplies an unregulated magnitude current, and the regulated outputs T32 and T33, across which the load transducer is connected. Also in series with transistor $Q_3$ to complete the path is a plurality of parallel resistors $R_1$ through $R_7$ which are inserted in parallel with the sensing resistor 108 depending on the condition of control switches $A_1$ through $A_7$. It will be remembered that control switches $A_1$ through $A_7$ are operated by the command bits of information of positions $A_1$ through $A_7$ on punched tape. The regulator circuit, consisting of $Q_1$, Zener diode 106, $Q_2$ and $Q_3$, actively maintains a constant voltage across resistor 108 and its associated precision programming resistor $R_1$ through $R_7$ despite voltage variations in the load. Changes in voltage drop from T32 to T33 are resistance changes in the circuit loop. The current through the regulated output terminals T32 and T33 is the sum of the currents through resistor 108 plus the currents through any additional resistors placed in shunt with resistor 108. If desired, the regulator ($Q_3$) could be a motor-driven potentiometer which seeks the proper value.

The operation of the circuit is as follows: when there are no holes in positions $A_1$ through $A_7$ on the tape, switches $A_1$ through $A_7$ are all in the open position. The value of $I_0$ at terminals T32 and T33 is 10 ma. and the temperature of the process is 50° F. When it is desired to increase the temperature of the process from 50° to 52½° F., switch $A_1$ is closed, thus placing resistor $R_1$ in shunt with resistor 108. The values of the two resistors are such that the current through the parallel resistors will increase a predetermined amount. The current through the parallel resistance combination 108 and $R_1$ will be 12½ ma. as compared to 10 ma. which previously went through $R_{108}$ alone. Therefore, the current through 108 will decrease and since there is less voltage drop across resistor 108, the base of $Q_1$ will go more positive with respect to the emitter of $Q_1$. This tends to reduce the current through transistor $Q_1$ which reduces the voltage drop across resistor 111. Since there is less voltage drop across 111, there is a more negative potential felt on the base of transistor $Q_2$. This causes transistor $Q_2$ to conduct more heavily, and consequently, places a more negative potential on the base of transistor $Q_3$. The negative voltage on the base of $Q_3$ causes transistor $Q_3$ to conduct more heavily but not overconduct. This accounts for the increased $I_0$ going through transistor $Q_3$.

Both diodes 106 and 110 operate in the breakdown Zener condition. Diode 106 establishes typical 6 volt high accuracy reference for the active regulator system and diode 110 acts as a constant voltage coupling device between $Q_2$ and $Q_3$ providing operating collector voltage for $Q_1$. This is necessary since the emitter of $Q_3$ is directly coupled to the base of $Q_1$ and without the Zener 110 the only collector voltage available for $Q_1$ would be the combined emitter to base voltage drops of $Q_2$ and $Q_3$.

The effect of the feedback circuit $Q_1$ and $Q_2$ is to reduce the amount of offset in the regulated loop by a factor of the current amplification factor of the feedback loop of $Q_1$ and $Q_2$. This is necessary to maintain proper linear relationships between the combination of resistors $R_1$–$R_7$ placed in parallel with resistor 108 and the magnitude of current $I_0$. Thus, if switches $A_2$ and $A_7$ were closed, their represented relative values must be in linear relationship with, for example, the closing of switches $A_2$ and $A_1$. Since the values of all parallel resistors $A_1$ through $A_7$ are fixed, linear relationships are effected by the feedback loop $Q_1$ and $Q_2$ which would reduce the offset by the amount of amplification factor by the feedback loop. If, for example, the value offset tends to distort linearity by a factor of 30 percent and the feedback loop had an amplification factor of 10,000, the result would be that the linearity relationship would be distorted by a factor of 0.00003 which, of course, is substantially negligible.

Therefore, linearity is preserved and the value of $I_0$ is linearly related to the assigned values of resistors $R_1$ through $R_7$ which are in turn related to the digital positions $A_1$ through $A_7$ on punched and programmed tape. Furthermore, the present circuit acts as a constant current supply circuit regardless of the value of loads placed across T32 and T33. The current $I_0$ will depend only on the voltage across resistor 108, maintained constant by regulator feedback loop and, consequently, will depend only on the combination of closed switches $A_1$ through $A_7$ which place a given amount of resistance in shunt with resistor 108. In this way, the tape reader can read digital information and commands, said digital information is converted into an analog control for current magnitude by the digital-to-current-magnitude control circuit. The output current is then fed to the transducer which controls the temperature controller for the dyeing process in a manner as described above.

It should be understood that terminals T32 and T33 could be connected directly to some types of commonly known temperature control instruments without the need of going through a transducer. With this type of arrangement, the magnitude controlled DC output current will directly control the set point of the temperature control instrument. One example of this type of instrument is the Foxboro Consotrol controller. Furthermore, a controlled rate of rise is entirely possible with the present system. In the past, rate of rise has been controlled by various timers and gadgetry which is unnecessary here since the present system can introduce known amounts of temperature rise for each 2½ minutes of tape advance. It is possible therefore to have as little as one degree rate of rise up to amounts which far exceed the capability of the machinery. With the proper wiring for temperature control, the system can also control the rate of cooling. That is, the system can reduce the temperature a definite amount for each 2½ minutes. By using one of the "extra" relays, the system can switch in cooling which consists of either cooling water or refrigeration and the rate of cooling would be controlled by the temperature instrument in the known manner.

Hence, there has been described an efficient, flexible, economical, reliable, automatic and rugged control system for the yarn dyeing process which can easily be programmed on a punched tape. The programmed medium, that is the tape, is easily stored and can be reused if the identical steps and sequence are to be run at some later date. This capability, of course, insures reliability of the process system so that a subsequently dyed lot of yarn will be substantially the same as a previously dyed lot using the same process sequence and materials.

It is to be understood that various modifications can be made to the present disclosed system without departing from the spirit of the invention. It is to be further understood that the present disclosure is given by way of example and that the present disclosed system can be incorporated with any process or method which needs a similar type of control. Therefore, the present invention should only be limited by the scope of the appended claims.

What is claimed is:

1. A system for sequentially controlling a plurality of activities of a batch process and for controlling the temperature of the process, said system comprising a fixed programmed medium bearing information in the form of bits arranged in fixed sequenced groups wherein each of a plurality of bits controls effectuation of each of a plurality of activities and an additional plurality of bits establishes predetermined temperature values for the system, reading means for sequentially sensing on a fixed time basis the information of each group appearing on said programmed medium, a plurality of activity on-off effectuating means connected to said reading means for sequentially receiving energization commands in accordance with the programmed information sensed by said reading means and effectuating each activity in accordance with the respective command regardless of the activity condition prior thereto, and temperature control means coupled to said reading means for receiving the programmed temperature information therefrom and controlling the temperature of the process accordingly.

2. In combination with the system as set forth in claim 1 an independent control means associated with one of the process activities for sensing the condition of the activity after it is initiated by the respective activity effectuating means and terminating the activity when a predetermined activity condition is sensed notwithstanding the condition of the associated activity effectuating means.

3. A control system as set forth in claim 1, wherein said reading means comprises clock means for establishing a time reference for the control system, said reading means coupled to hold and suspend said clock means, said activity effectuating means, and said temperature control means in response to a hold command appearing on said programmed medium and sensed by said reading means, and manual restarting means for restarting the sequential sensing of said programmed medium by said reading means and for re-energizing said clock means.

4. A control system as set forth in claim 1, wherein said reading means comprises a power source, a first plurality of activity control switches connected between said power source and said activity effectuating means, a second plurality of control switches connected to said temperature control means, a first plurality of electrical control means for individually and respectively controlling the position of each of said first plurality of control switches, a second plurality of electrical control means for individually and respectively controlling the position of each of said second plurality of control switches, said first and said second electrical control means being electrically connected to form an electrical scanning matrix having a plurality of rows and a plurality of columns therein, column read means for simultaneously sensing all information in one column of programmed information on said programmed medium for transferring an electric signal to each said row of electrical control means in said electrical matrix in response to the information programmed on said medium, and column scanning means for sequentially enabling the electrical signal applied to each row of said matrix to energize the particular electrical control means being scanned, whereby only the electrical control means receiving an electrical signal and being scanned are enabled to cause their respective control switches to change positions.

5. A control system as set forth in claim 4, wherein each said control switch and each said electrical control means comprises a latching relay having first and second coils, each of said plurality of rows of said electrical matrix having at least first and second leads, each said column having a single common lead, said first coil of said latching relay connected between said first lead and said common lead, said second coil connected between said second lead and said common lead, said column read means comprising switch means for sensing the programmed information on said medium and for enabling an electrical signal to appear on either said first or second leads in accordance with the programmed information.

6. A control system as set forth in claim 5, wherein said medium comprises a tape and the programmed bit information is punched holes at predetermined locations on said tape, said column read means further comprising a plurality of switches, each switch pivotally mounted and adapted to contact either said first or second lead in accordance with the programmed information being sensed, one end of each of said switches having feeler means adapted to protrude through a hole punched in said tape, and a source of electrical voltage connected to each said plurality of pivotable switches.

7. A control system as set forth in claim 4, wherein said scanning means comprises a multi-contact switch and sweep arm therefor, said multi-contact switch having a first contact being a home contact, at least a portion of said contacts being connected to medium advance means, said medium advance means connected to voltage source means, another portion of said contacts being individually connected to respective columns of said electrical matrix, sweep arm stepping means connected between a reference potential and said sweep arm for moving said sweep arm in response to an appearance and disappearance of an electrical signal therethrough, and said voltage source means connected to said column sensing means, said voltage source means further connected to said home contact through a switch, said switch disposed contiguous to and adapted to be closed by said clock means, and said switch also being adapted to be closed by manual restarting means.

8. A control system as set forth in claim 7, wherein storage means is connected between said medium advance means and each switch contact connected thereto, and storage means is connected between each column of said electrical matrix and said switch contact connected thereto, and wherein said sweep arm stepping means comprises at least one inductance means connected between said sweep arm and a reference potential, the values of inductance of said medium advance means and said inductance means being substantially greater than the capacitance value of said storage means, whereby the current through said sweep arm is substantially zero when said sweep arm arrives at one of said contacts and whereby the current through said sweep arm is substantially zero when said sweep arm leaves one of said contacts so that electrical arcing is avoided.

9. A control system as set forth in claim 1, wherein said temperature control means comprises digital-to-current-magnitude control means for supplying a predetermined minimum current to a temperature controller, said minimum current corresponding to a minimum temperature of the process to be controlled, said digital-to-current-magnitude control means connected to said second plurality of control switches, said digital-to-current-magnitude control means comprising regulating means for maintaining linearity between programmed temperature information and the output current from said digital-to-current-magnitude control means.

10. A control system as set forth in claim 9, wherein said current to temperature control means comprises a voltage source, said regulating means comprising variable resistance means connected in series with a constant resistance and said voltage source, said constant resistance connected in series with the temperature controller which is connected back to said voltage source to form a complete current loop, a plurality of predetermined resistors, each connected in parallel with said constant resistance, each of said plurality of resistors connected through one of said second plurality of control switches and each of said plurality of resistors effecting a predetermined change of current in said constant resistance, said regulating means further comprising a feedback means connected from one side of said constant resistance to said variable resistance means for changing the value of said variable resistance to maintain linearity between the output current and the corresponding temperature represented by the predetermined combination of energized control switches of said second plurality of control switches.

11. A control system as set forth in claim 10, wherein said variable resistance means comprises a transistor having emitter and collector electrodes connected between said constant resistance and said voltage source and a base electrode connected to said feedback means, said feedback means adapted to maintain the voltage across said constant resistance substantially constant notwithstanding the current through said predetermined combinations of said parallel resistors and notwithstanding the resistance change of the temperature controller.

12. A control system as set forth in claim 11, wherein said feedback means comprises amplifier means having a substantially large amplification factor.

13. A control system as set forth in claim 4, further comprising at least one timer, reversible valve means for controlling the direction of liquid being pumped at the process, at least one of said activity control switches being connected to said timer, said timer being connected to said reversible valve means, at least one other of said activity control switches connected directly to said reversible valve means, whereby said reversible valve means is selectively controlled either by said timer or said activity control switch connected thereto, depending upon the programmed information on said programmed medium.

14. A current magnitude control circuit comprising a voltage source connected in series with a variable resistance means, said variable resistance means connected in series with a constant resistance, said constant resistance connected in series with a utilization device, and said utilization device connected to said voltage source to form a complete current loop, a plurality of predetermined resistors, each said resistor connected in parallel with said constant resistance, each of said resistors connected through a normally open switch and each of said plurality of resistors effecting a predetermined change of current in said constant resistance when its associated switch is closed, feedback means comprising amplifier means with a substantially high current amplification factor connected from one side of said constant resistance to said variable resistance means for changing the value of said variable resistance to maintain linearity between the output current and the predetermined corresponding current value represented by predetermined combinations of said resistors placed in parallel with said constant resistance.

15. A control circuit as set forth in claim 14, wherein said variable resistance means comprises a transistor having emitter and collector electrodes connected between said constant resistance and said voltage source and a base electrode connected to said feedback means, said transistor operating in a non-saturated, non-cut off state, said regulating means adapted to maintain the voltage across said constant resistance substantially constant notwithstanding the current through said predetermined combinations of said parallel resistors and notwithstanding the resistance change of said utilization device.

16. A tape scanning and reading apparatus comprising an electrical matrix having a plurality of rows and a plurality of columns therein, each said column having one common lead, each said row having at least first and second leads, a plurality of latching relays each having first and second coils, each of said first coils connected between said first lead and each of said common leads, each of said second coils connected between each of said second leads and each of said common leads, a programmed medium comprising a tape having a plurality of columns located thereon, each of said tape columns having a number of rows corresponding to the number of rows in said electrical matrix, a predetermined number of punched holes located within said tape columns in accordance with predetermined programmed information, a plurality of sensing means including a voltage source and a plurality of switch arms adapted to electrically contact each of said first and second leads of each of said rows of said electrical matrix, all of said switch arms contacting one of said columns on said tape simultaneously, each switch arm electrically contacting said first lead upon sensing the absence of a hole and electrically contacting said second lead when a hole in said tape is sensed thereby, column scanning means for sequentially closing an electrical path between each said common lead and a source of reference potential and for advancing said tape so that the next column of said tape is positioned to affect said switch arms before said common lead corresponding to said next column on said tape is scanned by being connected in said electrical path associated therewith.

17. An apparatus as set forth in claim 16, wherein said scanning means comprises a rotary multi-contact switch and a sweep arm therefor, a voltage source connected in series with a capacitor and normally open switch means, said normally open switch means connected to the first contact of said multi-contact switch, the second and every other contact thereafter of said multi-contact switch connected to an associated first capacitor, each capacitor being shunted by a high resistance, each of said first capacitors being coupled to a tape advance coil, said tape advance coil being connected to said voltage source, the third and every other contact thereafter of said multi-contact switch being connected to an associated second capacitor each of which is shunted by a high resistance, each of said second capacitors coupled to one of said common leads of said columns of said electrical matrix, said sweep arm being connected to a relay coil, said relay coil being connected to a source of reference potential, a relay switch adapted to contact a normally closed contact and a normally open contact in accordance with the existence of an electrical field around said relay coil, said switch connected in series with a capacitor which is connected in series with a source of reference potential, said normally open contact connected to a sweep arm stepper coil, said stepper coil connected to a source of reference potential for moving said sweep arm from one of said multi-contacts to the next of said multi-contacts in a given direction when the electromagnetic field about said stepper coil collapses.

18. An apparatus as set forth in claim 17, wherein said relay coil is shunted by a Zener diode and said voltage source comprises a storage capacitor and means for charging said storage capacitor to a predetermined voltage with a predetermined polarity.

References Cited

UNITED STATES PATENTS

| | | | |
|---|---|---|---|
| 2,624,786 | 1/1953 | Potter | 340—173 |
| 2,860,199 | 11/1958 | James et al. | 200—46 |
| 3,027,072 | 3/1962 | Levin et al. | 235—61.11 |
| 3,044,007 | 7/1962 | Akers | 340—347 |
| 3,077,939 | 2/1963 | Turner | 340—147 |
| 3,094,609 | 6/1963 | Weiss | 340—172.5 |
| 3,129,322 | 4/1964 | Stout et al. | 235—151.1 |
| 3,215,983 | 11/1965 | Kilroy | 340—147 |
| 3,241,133 | 3/1966 | Herzl | 340—347 |
| 3,275,988 | 9/1966 | Yetter | 340—172.5 |

OTHER REFERENCES

Frady, W. E., et al., System Characteristics of a Computer Controller for Use in the Process Industries. In Proceedings of the Eastern Joint Computer Conference, Dec. 9–13, 1957, pp. 40–45.

PAUL J. HENON, *Primary Examiner.*

ROBERT C. BAILEY, *Examiner.*

J. P. VANDENBURG, *Assistant Examiner.*